United States Patent [19]
Kreutz

[11] Patent Number: 6,149,164
[45] Date of Patent: Nov. 21, 2000

[54] SEALING ARRANGEMENT RELATING TO CABLE AND PIPE TRANSITS

[75] Inventor: Thomas Kreutz, Lyckeby, Sweden

[73] Assignee: Roxtec AB, Karlskrona, Sweden

[21] Appl. No.: 09/138,228

[22] Filed: Aug. 21, 1998

[30] Foreign Application Priority Data

Aug. 22, 1997 [SE] Sweden ................................. 9703035

[51] Int. Cl.[7] .................................................... F16J 15/10
[52] U.S. Cl. .......................... 277/628; 277/602; 277/603; 277/619; 277/623; 277/625; 174/65 SS; 174/65 G; 174/152 G; 174/153 G
[58] Field of Search ..................................... 277/602, 603, 277/606, 607, 616, 622, 619, 625, 623; 174/65 R, 65 SS, 65 G, 152 G, 153 G

[56] References Cited

U.S. PATENT DOCUMENTS

| 849,883 | 4/1907 | Brinkman ................................. 285/412 |
| 3,779,585 | 12/1973 | Handlik ................................. 174/65 G |
| 5,697,194 | 12/1997 | Gignac et al. . | |

FOREIGN PATENT DOCUMENTS

| 0429916 | 6/1991 | European Pat. Off. . |
| 2909890 | 9/1980 | Germany . |
| 1029294 | 7/1983 | U.S.S.R. . |

Primary Examiner—Anthony Knight
Assistant Examiner—Enoch E Peavey
Attorney, Agent, or Firm—Alfred J. Mangels

[57] ABSTRACT

A sealing arrangement relating to cable and pipe leadthroughs that extend through a wall. The arrangement includes a frame and one or more modules made from a compressible material and including an axially-extending channel through which a cable or a pipe is adapted to pass in sealing abutment with respective module channels. The frame includes one or more modules that are mounted within and sealed relative to the frame, and also includes a first part and a second part, each provided with a respective opening, intended to be fitted on both sides of a wall in which an opening has been formed. A third frame part in the form of a body formed from a compressible material, such as rubber, and having an opening that has generally the same size as the openings in the respective first and second frame parts, is positioned between the first frame and second frame parts, wherein the third frame part accommodates the modules. The first and second frame parts can be drawn toward each other and the third frame part has a size such that it will be compressed as the first and second frame parts are drawn together to exert a sealing pressure force on the modules and on the first frame part and the wall.

5 Claims, 2 Drawing Sheets

SEALING ARRANGEMENT RELATING TO CABLE AND PIPE TRANSITS

BACKGROUND OF THE INVENTION

1. Field of the Invention

The present invention relates to a sealing arrangement pertaining to cable and pipe transits.

2. Description of the Related Art

Published European Patent Application 0 429 916 describes a module made of a rubber material, wherein the module includes an axially extending and centrally positioned channel in which a cable or a pipe is intended to run. The module includes radially outside the channel, or passageway, peelable layers of the same material as the remainder of the module. The intention is to enable the channel to be adapted for accommodation of the cable or pipe concerned, by peeling away the necessary number of layers to this end.

The module is intended to be mounted in a frame which, in turn, is mounted in the wall or like structure through which the cable or pipe shall pass. Naturally, the frame must be sealed against the wall to which it is fitted, in order to obtain a tight lead-through or transit. The modules must also lie tightly against the frame, with the module in sealing abutment with the cable or pipe.

The frame is first fitted against the wall together with a sealing means, for instance a rubber packing. A module, or several mutually abutting modules, is/are then fitted in the frame, together with a separate expansion element. After having drawn the cables or pipes through the channels in respective modules, the expansion element is tightened such as to exert pressure on the modules and therewith compress the modules to an extent at which they lie tightly against the cables or pipes. This procedure thus requires several working steps, and also requires the use of an expansion element in providing a sealed and tight cable or pipe transit.

The present invention provides a highly advantageous cable or pipe lead-through of the aforedescribed kind with which the expansion element is not required, therewith eliminating some of the working steps.

SUMMARY OF THE INVENTION

The present invention thus relates to a sealing arrangement relating to wall-mounted cable and pipe lead-throughs that include a frame and one or more modules including of compressible material and having an axially extending channel through which a cable or a pipe is intended to pass in sealing abutment with respective module channels. The lead-through includes a frame in which one or more modules are tightly and sealingly fitted relative to the frame. The frame includes a first part each and a second part provided with an opening and intended to be fitted on both sides of a wall in which an opening has been made. Between the first and the second frame parts is positioned a third frame-part in the form of a body made of compressible material, such as a rubber material or the like, and having an opening which has essentially the same size as the openings in the respective frame-parts. The opening is intended to accommodate the module or modules. The first and the second frame-parts can be drawn towards one another, and the size of the rubber body is such that it is compressed as the first and the second frame-parts are drawn together, therewith exerting a sealing pressure against the modules, against the first frame part and against the wall.

BRIEF DESCRIPTION OF THE DRAWINGS

The invention will now be described in more detail with reference to exemplifying embodiments thereof and also with reference to the accompanying drawings, in which.

DESCRIPTION OF THE PREFERRED EMBODIMENTS

Figure 5:
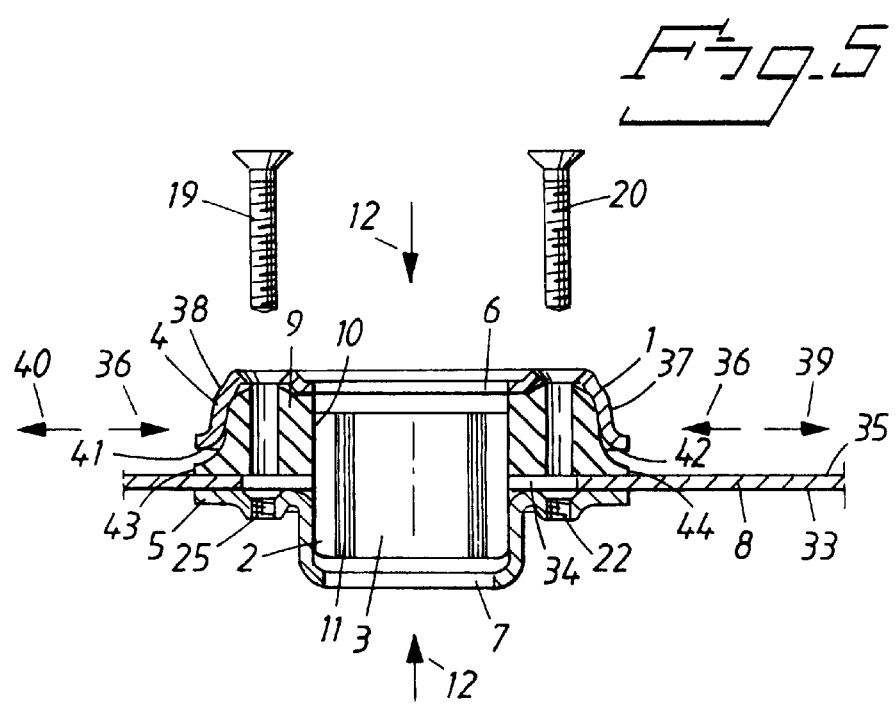
FIG. 5 is a cross-sectional view of the arrangement fitted to a cabinet wall.

FIG. 5 illustrates a sealing arrangement which relates to wall-mounted cable and pipe lead-throughs and which includes a frame 1 and one or more modules 2 comprised of a compressible material and having an axially extending channel 3 through which a cable or a pipe is intended to pass in sealing abutment with respective module channels, and including a frame in which one or more modules are fitted and sealed relative to the frame. FIG. 5 shows only one such module 2.

According to the invention, the frame includes a first part 4 and a second part 5 having respective openings 6, 7 and intended to be fitted on respective sides of a wall 8 in which an opening 34 has been made. These frame-parts are suitably made of sheet metal or are molded, depending upon dimensions, among other things. The frame-parts may alternatively be made of a plastic material.

Provided between the first and second frame-parts 4, 5 is a third frame-part 9 in the form of a body made of compressible material, such as rubber material, and having an opening 10 which has essentially the same size as the openings 6, 7 in respective frame-parts 4, 5. It is preferred to use a rubber material, even though other materials, such as compressible plastic materials, may be used.

The opening 10 in third frame-part 9 is intended to receive a sealing module 2 or several modules, having peelable layers in accordance with the aforesaid patent specification and as illustrated in FIG. 5. The region 11 shown in densely packed lines illustrates the aforesaid peelable layers. Such modules 2 are commercially available and are formed from, e.g., the rubber material Roxylon having a hardness of 80±5° Shore A.

The first and the second frame parts 4, 5 can be drawn towards one another, i.e. contracted. The third frame-part 9 is dimensioned so as to be compressed in the contraction direction 12 as the first and the second frame parts are drawn together; see FIG. 5.

According to one preferred embodiment, the first frame part 4 has a generally U-shaped cross-section. The third frame-part 9 has a corresponding shape and is intended to be placed in the U-shaped first frame 4 part and against the wall 8 through which the cable or pipe lead-through shall be installed. The rubber material from which third frame part 9 is made has essentially the same hardness as the module material. For instance, third frame-part 9 can be made of a so-called SBR rubber. The rubber can have a hardness such as to enable third frame-part 9 to compress the module/modules into sealing abutment with the cable or pipe concerned.

Figure 1:
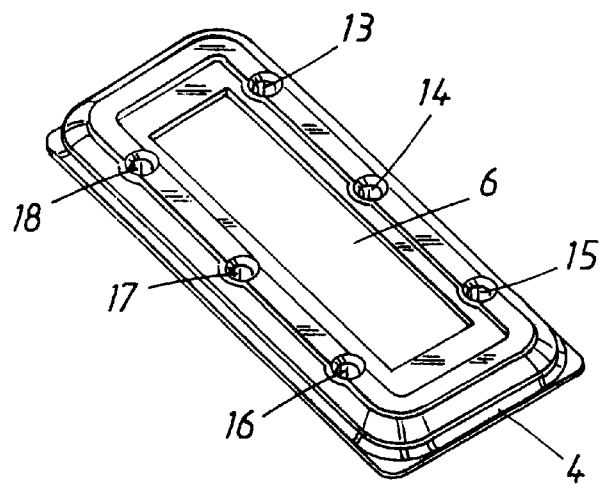
FIGS. 1–3 illustrate three different parts of the inventive arrangement.
Figure 2:
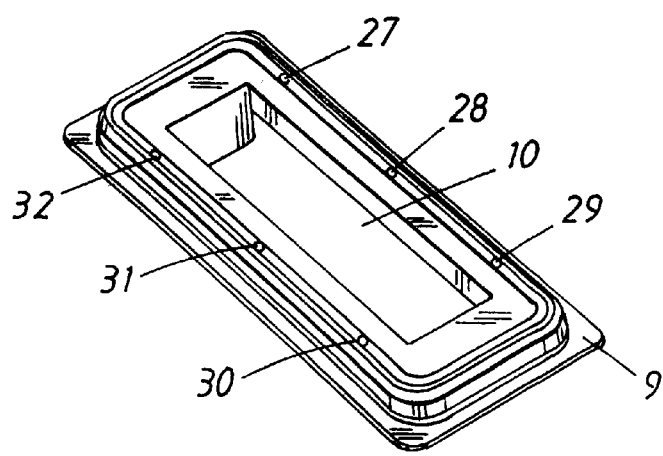
Figure 3:
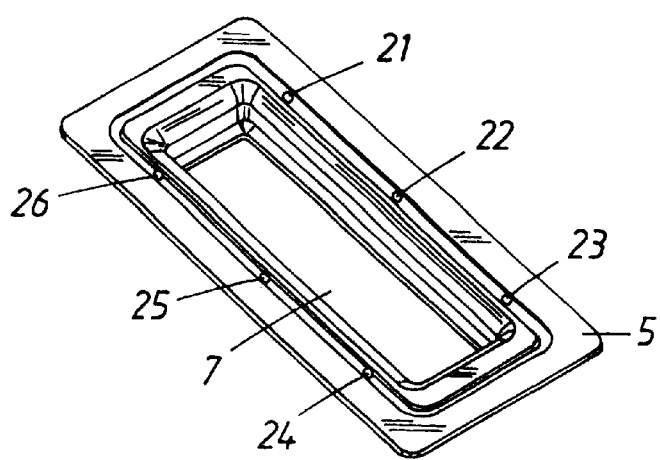
Figure 4:
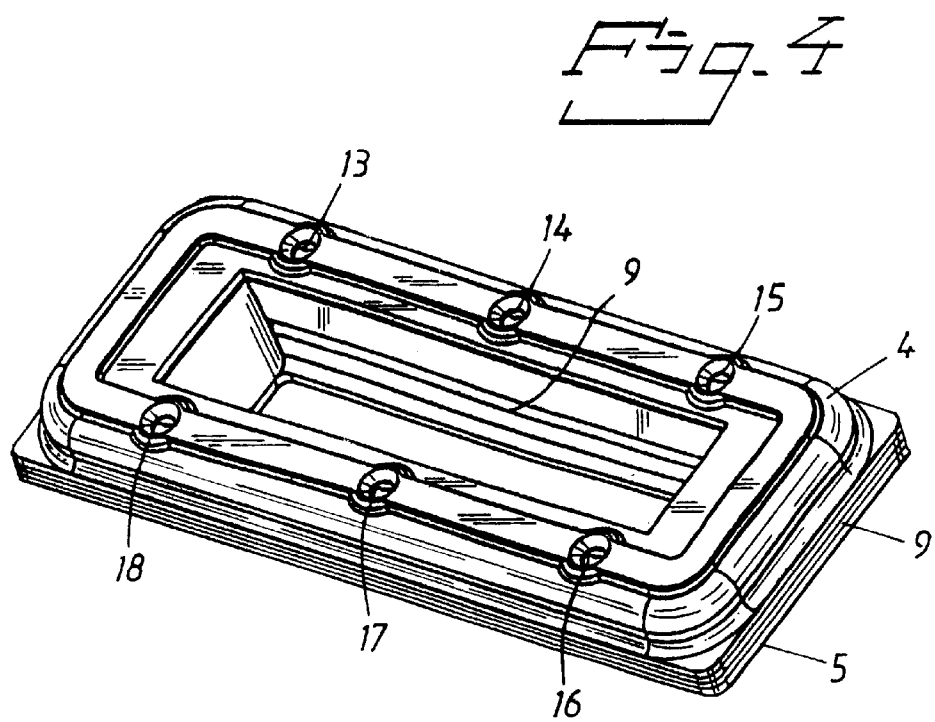
FIG. 4 shows the three parts of FIGS. 1–3 combined together.

According to another preferred embodiment, the first frame-part 4 and the third frame part 9 have through-penetrating holes 13–18; 27–32 (see FIGS. 1 and 2) for receiving screws 19, 20. The second frame-part 5 (see FIG. 3) is provided with threaded screw bushings 21–26 or threaded screw holes which co-act with the screws such as to draw the first and the second frame-parts 4 and 5 towards one another.

The sealing arrangement is assembled in the following way. The second frame-part 5 is placed on the rear side 33 of the wall 8, opposite the wall opening 34. The third frame-part 9 and the first frame-part 4 are then placed against the front side 35 of the wall, whereafter the screws 19, 20 are lightly tightened so as to hold the assembly together.

The modules 2 are then placed in the opening 10 in third frame-part 9. This stage of assembly is shown in FIG. 5, although no cable or pipe is shown in the channel 3 in the module 2. Cables or pipes are drawn through respective channels in the modules in this stage of assembly.

In the next stage, the screws are firmly tightened, therewith compressing third frame-part 9 in the contraction direction 12. Third frame-part 9 will therewith exert pressure on the module 2 in the direction shown by arrows 36. Third frame-part 9 also exerts pressure on the sides 37, 38 of the first frame-part in the direction indicated by arrows 39, 40.

As a result of the pressure exerted by third frame-part 9 against the modules, the modules 2 will be compressed into sealing abutment with the cables or pipes concerned.

Subsequent to said contraction, the flanges 41, 42 of the first frame-part will abut the flanges 43, 44 of third frame-part 9.

It will be apparent from the aforegoing that the first frame-part and the third frame-part provide a) a seal between third frame-part and the wall; b) a seal between the third frame-part and the first frame-part; c) a seal between the third frame-part and the module or modules; and d) a seal between respective modules and the cable or pipe concerned.

The invention thus obviates the need for the expansion element mentioned in the introduction and also certain working steps.

The invention has been described above with respect to an exemplifying embodiment illustrated in the accompanying drawings.

It will be understood, however, that other types of screw joints or clamping joints can be used. The frame may alternatively have a square or round outer shape, although the opening in the third frame-part will preferably be rectangular in shape. The openings in the frame parts and the third frame-part will, of course, be adapted to accommodate the number and size of the modules to be used. It will also be understood that the shape of the three frame-parts in general can be adapted to suit the application in question.

The invention shall not therefore be considered restricted to the aforedescribed and illustrated embodiments, since variations and modifications can be made within the scope of the following claims.

What is claimed is:

1. A sealing arrangement for a cable and pipe lead-through that is positioned on a wall through which a cable or pipe passes, said sealing arrangement comprising:

a frame for installation on opposite sides of a wall having spaced first and second wall outer surfaces and having an opening extending therethrough, the frame including a first frame part and a second frame part each having a respective opening for substantial alignment with the wall opening, wherein the first frame part is adapted to overlie a portion of the first wall outer surface and the second frame part is adapted to overlie a portion of the second wall outer surface, a third frame-part adapted to be positioned between the first and second frame parts and formed from a compressible material, the third frame part having an opening substantially aligned with the openings in the first and second frame parts;

a sealing module made of a compressible material and adapted to be positioned within the frame, the sealing module having peelable layers of material and including an axially-extending channel through which a cable or pipe can pass in sealing abutment therewith, wherein the sealing module is positioned within the opening in the third frame part, and wherein the channel size can be changed by peeling sufficient layers from the sealing module to accommodate a cable or pipe;

wherein the first and second frame parts each include respective connection means for drawing the first and second frame parts toward each other and for compressing the third frame part therebetween to exert a sealing force on the first frame part, on a surface of the wall outside the wall opening, and on the sealing module to sealingly urge the sealing module against a cable or pipe that extends through the opening in the frame.

2. A sealing arrangement according to claim 1, wherein said first frame-part has a generally U-shaped cross-section; and wherein the third frame-part is placed in said U-shaped part and against an outer surface of the wall through which the cable or pipe passes.

3. A sealing arrangement according to claim 1, wherein said first frame-part and said third frame-part include through-penetrating holes for screws; and wherein said second frame-part includes threaded openings for co-action with said screws in drawing said first frame-part and said second frame-part together.

4. A sealing arrangement according to claim 1, wherein the first and second frame parts are each unitary structures.

5. A sealing arrangement according to claim 4, wherein the third frame part is made from rubber.

* * * * *